United States Patent Office 3,445,327
Patented May 20, 1969

3,445,327
ABRASIVE-RESISTANT DECORATIVE LAMINATES
AND METHOD FOR MAKING SAME
Peter E. Fuerst, Coshocton, Ohio, assignor to General
Electric Company, a corporation of New York
No Drawing. Filed Mar. 26, 1964, Ser. No. 355,061
Int. Cl. B32b 27/10, 5/16
U.S. Cl. 161—264                                    6 Claims

ABSTRACT OF THE DISCLOSURE

Decorative laminates having hard or abrasion-resistant particles in the surface coating are given a textured surface by including between the surface of the laminate and press pan during pressing and curing a dead-soft foil of a soft metal.

---

This invention relates to laminates and to a process of preparing laminates having a wear-resistant surface of particular texture.

Laminates having surfaces possessing a wide variety of desirable properties are well known. However, because of the increasingly widespread use of laminates in such applications as surfaces which must resist abrasion such as floors and the like, the demands upon these laminates have become more and more exacting. Of course, perhaps the single most important property of such laminates is their wear or abrasion resistance. Such wear-resistant laminates are described, for example, in copending application S.N. 32,653, filed May 31, 1960, now Patent 3,135,643, issued June 2, 1964 and copending application Ser. No. 354,968, filed Mar. 26, 1964, now U.S. Patent No. 3,373,071 both assigned to the same assignee as the present invention. Briefly, the first of the above copending applications relates to the provision of a wear-resistant surface for laminates in which the usual thermosetting resin-impregnated overlay or wear-resistant alpha cellulose or other layer is replaced by a composition comprising a thermosetting resin, finely divided silica and a finely divided fibrous material in the form of discrete fibers having a refractive index approximating that of the cured thermosetting resin. Such compositions are clear and highly translucent in the cured condition, the fibrous material serving as a carrier for the silica, retaining it in the surface of the laminate for its wear- or abrasion-resistant role. The second of the above copending applications relates to the replacement of the impregnated overlay by a composition comprising a thermosetting resin, silica and microcrystalline cellulose in lieu of the fibrous material, the microcrystalline cellulose again having a refractive index approximating that of the cured thermosetting resin, the surfacing composition again being clear and highly translucent in its cured condition so that it does not detract from the decorative effect of any overlying print layer which may be used.

It will be apparent that one of the requirements of such wear-resistant laminates, particularly for flooring, is that it shall have the proper texture. It has been found that a satisfactory texture for such flooring material is one which approximates that of slate material, both from an appearance point of view and from the point of view of roughness which will resist undue slipping of objects on the material and provide a non-skid surface.

It is customary in many applications during the pressing and curing of ordinary laminates to provide a textured material thereon by placing a piece of parchment paper or similar material between the laminate surface of the press pan plates, the rough surface of the parchment or other rough material being imprinted in the laminate surface in the nature of a facsimile. It has been found that such surfaces are too rough for wear-resistant laminates of the above type since they cause undue creasing and collection of dirt. It is also customary in many cases to abrade the surfaces of such laminates as by brushing them using an abrasive slurry. It has been found that such practice, once again, is inadequate because the abrasive particles tend to produce scratches in the surface of the material rather than to provide a uniform roughness.

A primary object of the present invention is to provide a suitable slate-like or non-skid texture for laminates, particularly those which contain abrasive- and wear-resistant particles on or in the surface thereof.

Briefly stated, the present invention relates to laminates having hard wear- or abrasion-resistant particles in the surface thereof which are provided with a uniform textured appearance such as that of slate by placing between the press pan and the laminated surface during the forming process a thin layer of dead soft foil of a soft material such as aluminum, lead and the like. The required texture is obtained during the pressing operation by the penetration of the hard particles of the surface of the laminate into the soft foil to produce a uniformly textured surface.

Those features of the invention which are believed to be novel are set forth with particularity in the claims appended hereto. The invention will, however, be better understood and further advantages and objects thereof appreciated from a consideration of the following description.

The core stock of the present laminates is prepared in any usual manner, it consisting typically of about eight sheets of eleven mil kraft paper impregnated with a standard thermosetting impregnating resin. The most common of such resins is a condensation product of a phenol and an aldehyde and generally an alkaline catalyzed phenol formaldehyde condensation product. Often, a 50% solution of the standard laminating resin is used with the final resin solids content of the core stock being about 40% of the total weight of the core. Typically, the sheets are oven-dried after impregnation for a period of from one to two minutes at a temperature of from about 140° C. to 170° C. The print paper which consists of a highly purified cellulose paper, such as alpha cellulose or other material or synthetic papers or paper containing both natural and synthetic fibers, imprinted with the desired design, is impregnated typically with a 50% solids content solution of a thermosetting resin, preferably a melamine resin. These resins are condensation products of melamine and an aldehyde and are noted for their excellent wear properties, their translucency and their resistance to discoloring. However, well known resins prepared from other amino-triazines, urea, dicyandiamide, light, highly purified phenolic resins, polyester resins, such as the unsaturated alkyd vinyl monomer type, ethoxyline resins, etc. may also be used. Among the melamine resins which can be used are those described more fully in U.S. Patent 2,605,205, issued July 29, 1952. An example of a particular melamine surface impregnating resin useful in connection with this invention is a modified melamine formaldehyde reaction product produced by American Cyanamid Company and sold under the name Cymel 428. This resin is a white, free-flowing powder specifically designed for the treatment of paper to be used in decorative laminates. The resin is readily soluble in water or in an alcohol-water solvent and gives a clear, colorless solution which is stable at 50% solids content for at least two days at room temperature. Typical properties of a 50% aqueous solution of this resin at 25° C. include a pH of 9.0 to 9.3, a Gardner viscosity of A to B, a solids content at maximum dilution in water of 26% and a solids content at maximum dilution in 90 parts by volume of water and 100 parts by volume of 2B alcohol of 14%.

A phenolic resin which can be used in connection with the invention for the surface composition is a light colored, thermosetting, general purpose phenol formaldehyde resin sold by the Monsanto Chemical Company under the name of Resinox 470. A typical polyester which can be used for curing a print sheet is a general purpose, thermosetting resin made by reacting two moles of propylene glycol, one mole of maleic anhydride and one mole of phthalic anhydride, 70 parts of such polyester being copolymerized with 30 parts of styrene.

The print paper is impregnated to a dry resin content typically of between 33 and 42% by weight. The impregnated paper while still wet should not have an excess wet solution on the surface because this causes difficulty in coating. For this reason, the impregnated print paper is passed between the nip of rolls or subjected to other treatment to remove resin in excess of the above amount.

A coating composition is applied to the wet surface of the impregnated print paper as by means of a knife coater or equivalent process. Briefly, the coating composition prepared according to copending application S.N. 32,653 is prepared by combining 100 parts of a melamine formaldehyde resin such as that above with from about 5 to 30 parts by weight of finely divided cellulosic flock, substantially all of the discrete fibers of the flock being capable of passing through a 100 mesh screen.

The silica used in connection with the present invention is finely divided, pure white silica flour produced by the Pennsylvania Pulverizing Company, Pittsburgh, Pa., and sold under the names of 30 Micron Min-U-Sil and Opal Silica. These silicas are substantially pure silicon oxide. In a typical 30 Micron Min-U-Sil silica, 97% by weight has a particle size of less than 30 microns, with an average particle size of 3 microns and substantially no particles of a size over 40 microns. The color (reflectance) is 83.5 and the surface area 5400 cm.$^2$/gram. The pH is 7.0, the bulk density 63.0 lbs./cu. ft., and the iron content expressed as $Fe_2O_3$ is 230 parts per million. A typical Opal Silica has a particle size of 0.9 plus 325 mesh and the color (reflectance) is 83.5. 99.3% by weight of the Opal Silica is finer than 43 microns and the average particle size is about 11.9 microns. The surface area of this material is 7300 cm.$^2$/gram and the pH is 7.0. The bulk density of the material is 68.6 lb./cu. ft. and the iron content expressed as $Fe_2O_3$ is 190 parts per million. Still another useful silica produced by the same company is 25 Micron Silica having an average particle size of 7.2 microns and substantially no particles larger in size than 30 microns. Mixtures of such silicas are also used.

Generally speaking, finely divided silica oxides substantially free of extraneous color are useful in connection with the present invention. Natural occurring silica in the form of silica flour has been found to give excellent results. The maximum particle size of the silica is generally limited by processing rather than product considerations, silicas having particles ranging in size up to about 40 microns with an average size of about five to ten microns being preferred. No advantage seems to accrue from the use of very fine particle silicas, as for example, the silica aerogels. The particle size of the silica will depend on the amount of abrasion resistance desired on the laminate surface and the processing limitations. Amounts of silica greater than about 30 parts, by weight, per 100 parts of resin solids introduce a problem of haze. As little as 5 parts has a beneficial effect on wear resistance. It will be realized, of course, that other finely divided material besides silica which has comparable transparency and index of refraction can be used.

According to copending application 8D–899, cited above, the cellulosic flock of the other copending application is replaced by a microcrystalline cellulose which is produced by the severe acid hydrolysis of pure cellulosic fibers which removes the amorphous constituents of the fibers leaving only microcrystals which are free from their structure by shear mixing. A particular material of this type is sold by the American Viscose Corporation as Avirin and Avicel and the specific method of its preparation is well known, being set forth, for example, in Industrial and Engineering Chemistry, volume 54, No. 9, September 1962, beginning at page 20 and in the patent and other literature. Typically, when using the microcrystalline cellulose, the coating composition consists of 100 parts of the above Cymel 428, melamine resin, from about 5 to 30 parts of silica flour and from about 10 to 50 parts of the above microcrystalline cellulose.

The impregnated and coated print paper is passed through a forced air-drying oven containing a conveyor to support the web at a temperature of from about 140° C. to 170° C. for from about 3 to 5 minutes. The weight of the dried coating is typically from about 0.22 to 0.33 lb./sq. ft. of print sheet and the volatile content of the dried print sheet should be in the range of from about 2% to 5% and preferably from about 2% to 3%. The core and print sheets thus prepared are then cut to size and the coated print sheet is placed above the eight sheets of core stock and the coated and impregnated sheets are laminated under heat and pressure. Particularly, the times of laminating vary from about 20 to 25 minutes and the temperature from 130° C. to 150° C. and the pressure from about 1000 to 1500 p.s.i. The laminates are cooled while still under pressure to below 40° C. and removed from the press. The above description of the preparation of the cores is illustrative only of various ways in which such laminates may be made. For example, as pointed out above, it is possible to incorporate in an overlay sheet abrasive particles although the surface coating compositions described above are much preferred.

The crux of the present invention lies in the actual laminating procedure. According to the present invention instead of pressing and curing the laminates with the laminate surface next to a polished stainless steel or other polished panel, there is placed between the metal panel and the surface of the laminate a thin layer of soft aluminum foil which is typically about one mil thick and is tempered to the dead soft condition. It will be appreciated that with the application of heat in the laminating process, the resinous surface coating composition becomes quite thin and the silica or other abrasive particles therein have an opportunity to flow into an even pattern and to contact and press into or penetrate the dead soft foil which is relatively much softer. Since the wear-resistant particles are uniformly distributed throughout the surface coating composition, a multiplicity of such particles contacts and penetrates the foil so that when the pressing and curing operation is completed, the laminate removed from the press and the foil peeled from the surface of the laminate, there is presented a roughened, slate-like, non-skid texture resulting from the action of the abrasive particles on the foil. It has been found that such penetration of the foil and texture does not occur when an overlay sheet loaded with abrasive particles is used.

When using the fibrous material of copending application S.N. 32,653 referred to above, there are used typically for each 100 parts of resin, from about 5 to 30 parts of silica and 10 to 40 parts of the fibrous material.

The following examples will illustrate the practice of the present invention and its advantages, it being realized that they are not to be taken in any way as limiting.

A coating composition was prepared by mixing together for about one minute in a high shear blender, such as a Cowles blender, 64 parts of water, 12.5 parts of sodium carboxymethyl cellulose in 2% concentration a tackifier and 10 parts of finely divided silica consisting of one-third 30 Micron Min-U-Sil and two-thirds Opal Silica as described above. There were added to the above mixture 100 parts of Cymel 428, melamine resin, and the mixture was again blended to a homogeneous mix. There were then added 10 parts of Avirin microcrystalline cellulose with thorough mixing. This material was used to surface coat a laminate prepared otherwise as described above.

A number of laminate examples about 36 by 72 inches were pressed and cooled as above, the only difference being in the insertion between the surface and the press pan of various types of foil or no foil. In one case, a hard aluminum foil was used between the surface and the press pan. In another instance, a dead soft foil of aluminum one mil thick was used. In a third instance, no foil was used but the resulting laminate was brushed with an abrasive after curing and in still another instance, no foil was used and the laminate was not brushed after preparation. When hard foil was used between the laminate surface and the press pan, the average profilometer reading of the prepared surface indicated an average surface roughness of 0.05 mil. When no foil was used and the laminate surface after preparation was brushed, a similar surface roughness was obtained but many scratches were observed. When no foil was used and the resultant laminate surface was not brushed, the average surface roughness as shown by profilometer reading was about 0.03 mil. On the other hand, when the dead soft foil of the present invention was used, the average profilometer surface roughness reading of the surface was 0.12 mil and the surface had a pleasing slate-like textured feel and appearance and was resistant to skidding. Furthermore, the profilometer reading for the soft foil-treated material was uniform both in the grain direction and cross grain direction of the laminate core, whereas the material which was simply brushed showed a variation between the long grain and the cross grain directions. The present laminates also have a surface which is non-directional in so far as gloss or surface appearance is concerned.

There are provided, then, by the present invention a process for producing hard-surfaced, wear-resistant laminates which are characterized by a roughened slate-like texture which resists skidding.

What I claim as new and desire to secure by Letters Patent of the United States is:

1. In the press curing of an abrasion-resistant decorative laminate comprising a core and a surface lamina positioned thereover, said surface lamina a thermosetting resin and silica and being clear and highly translucent in its cured condition, the improvement which comprises including between the surface of said laminate and the press pan a dead soft foil of a soft metal.

2. In the press curing of an abrasion-resistant decorative laminate comprising a core and a surface lamina positioned thereover, said surface lamina being coated with a composition comprising a thermosetting resin and silica, said composition being clear and highly translucent in its cured condition, the improvement which comprises including between the surface of said laminate and the press pan a dead soft foil of aluminum.

3. In the press curing of an abrasion-resistant decorative laminate comprising a core and a surface lamina positioned thereover, said surface lamina being coated with a composition comprising a thermosetting resin and silica, said composition being clear and highly translucent in its cured condition, the improvement which comprises including between the surface of said laminate and the press pan a dead soft foil of copper.

4. In the press curing of an abrasion-resistant decorative laminate comprising a core and a surface lamina positioned thereover, said surface lamina being coated with a composition comprising by weight 100 parts of a thermosetting resin, from about 5 to 30 parts of finely divided silica, and from about 10 to 50 parts of finely divided microcrystalline cellulose having a refractive index approximating that of the cured resin, the improvement which comprises including between the surface of said laminate and the press pan a dead soft foil of a soft metal.

5. In the press curing of an abrasion-resistant decorative laminate comprising a core and a surface lamina positioned thereover, said surface lamina being coated with a composition comprising by weight 100 parts of a thermosetting resin, from about 5 to 30 parts of silica and from about 10 to 40 parts of finely divided cellulosic flock having a refractive index approximating that of the cured resin, the improvement which comprises including between the surface of said laminate and the press pan a dead soft foil of a soft metal.

6. The product produced by the process of claim 1.

References Cited

UNITED STATES PATENTS

| 3,135,643 | 6/1964 | Michl | 161—158 |
| 3,215,579 | 11/1965 | Hagen | 156—289 |
| 3,259,537 | 7/1966 | Battista | 161—267 |

FOREIGN PATENTS 667,363 7/1963 Canada.

EARL M. BERGERT, *Primary Examiner.*

M. L. KATZ, *Assistant Examiner.*

U.S. Cl. X.R.

156—323; 161—158, 413